Dec. 11, 1945.   E. ECKENER   2,390,524
INSERT ASSEMBLING TOOL
Filed May 30, 1944   2 Sheets-Sheet 1
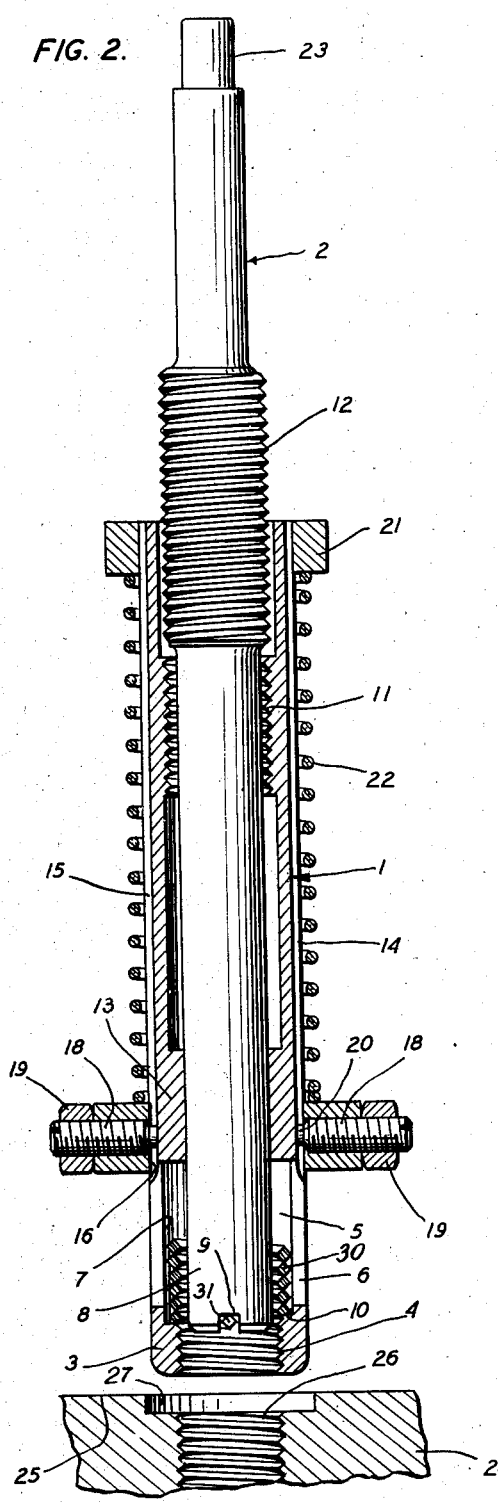
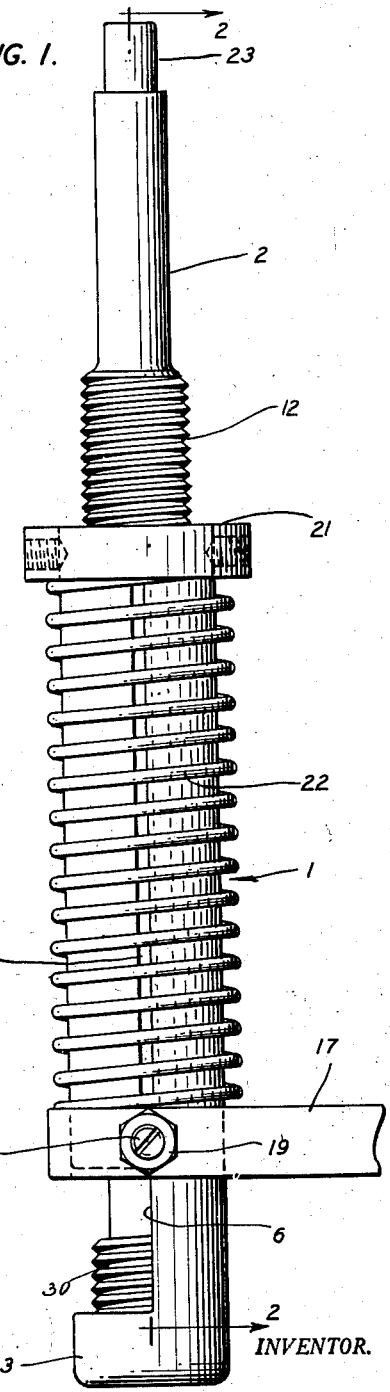
INVENTOR.
BY ERWIN ECKENER
ATTORNEY Dec. 11, 1945.   E. ECKENER   2,390,524
INSERT ASSEMBLING TOOL
Filed May 30, 1944    2 Sheets—Sheet 2
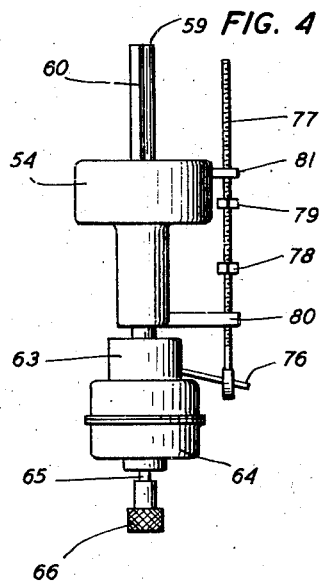
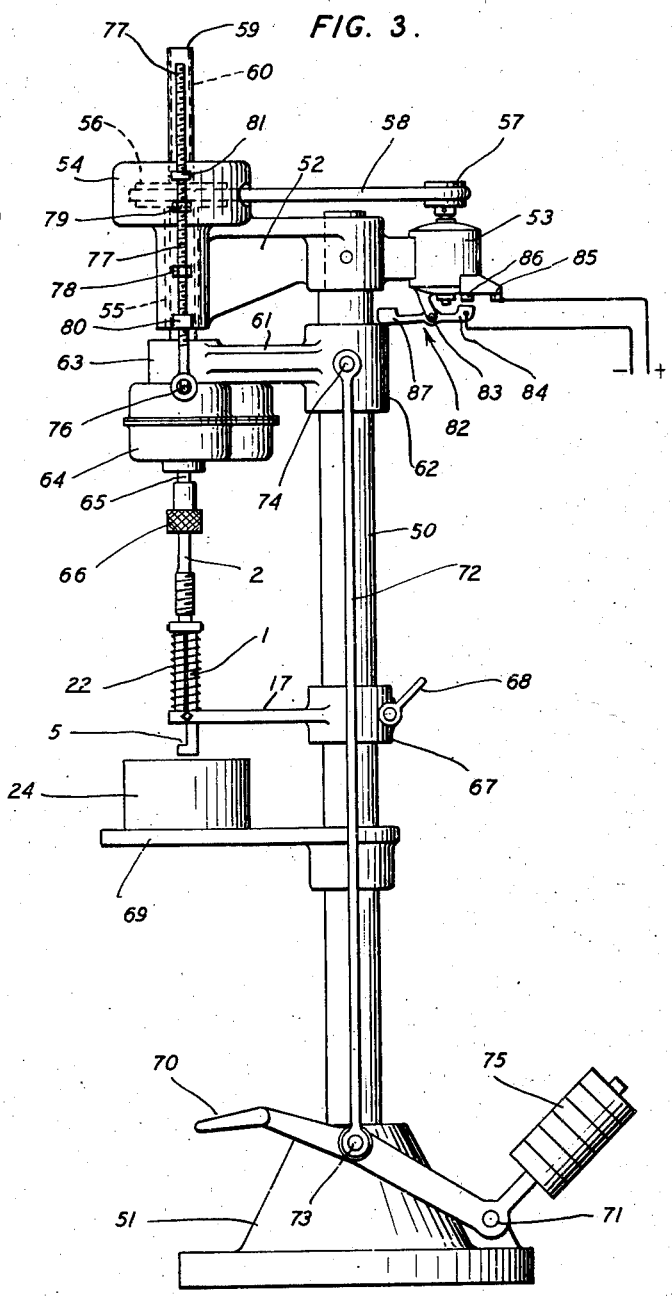
INVENTOR.
ERWIN ECKENER
BY
ATTORNEY Patented Dec. 11, 1945

2,390,524

UNITED STATES PATENT OFFICE 2,390,524

INSERT ASSEMBLING TOOL

Erwin Eckener, Bronx, N. Y., assignor to Aircraft Screw Products Company, Inc., Long Island City, N. Y., a corporation of New York Application May 30, 1944, Serial No. 537,984.

8 Claims. (Cl. 10—1)

The invention relates to a tool for assembling a wire coil in the tapped hole of a boss or nut member, and more particularly to a tool of the type described in U. S. Patent No. 2,316,231 of April 13, 1943, to Evans. A tool of said type comprises a tubular member and a rod-like member in coaxial arrangement thereto and movable therein to grip a wire coil placed into said tubular member and to pass it through an internally threaded end portion of the latter and on into the threaded hole for which it is destined. The conventional tool has been found useful if operated by hand but not fully satisfactory when used in a power-driven machine. The invention aims, therefore, to render a tool of the mentioned type applicable to a machine including suitable gears for connection to a power source. A further object of the invention is the provision of a machine in which a tool of said type is incorporated.

The invention consists in the provision of certain guiding means for the movement of the rod-like member in relation to the said tubular member, and also of guiding means for said tubular member in relation to a stationary part.

Further objects and details of the invention will be apparent from the description given hereinafter and the accompanying drawings illustrating an embodiment thereof by way of example.

In the drawings:

Fig. 1 is a side elevation of a tool according to the invention and adapted to be attached to a power-driven machine;

Fig. 2 is a cross-section along line 2—2 of Fig. 1;

Fig. 3 is a diagrammatical side elevation of a power-driven machine to which the tool of Figs. 1 and 2 is applied; and Fig. 4 is a front view of the top portion of the machine of Fig. 3.

Referring now to the drawings, the tool illustrated in Figs. 1 and 2 comprises a substantially tubular member 1 and a rod member 2 in a coaxial arrangement thereto. The tubular member 1 includes an end portion 3 provided with an internal threading 4. Adjacent portion 3 there is a portion 5 which is laterally recessed at 6 and has an approximately semi-cylindrical side wall 7. This portion 5 constitutes a charging chamber and is intended to receive therein a wire coil preparatory to being passed through the threading 4 where the coil will be contracted to the diameter and pitch of the tapped hole of a boss or nut member into which the coil is to be inserted. For this purpose the portion 5 has an inner diameter according to the outer diameter of the coil prior to its contraction and the threading 4 is of a diameter and pitch and preferably also of a shape according to that of said tapped hole. In the drawing, a wire coil 30 is shown positioned in the charging chamber 5. Similarly, a portion of a boss member 24 with a top surface 25 and a threaded hole 26 to be lined with the coil 30 is indicated underneath the tool. The illustrated coil wire is of diamond-shaped cross-section, but as far as the tool according to the invention is concerned, it may be of any other desired cross-section, as e. g. circular or pear-shaped. In most instances, the wire form will be chosen according to the form of the thread groove of the tapped hole, and also the threading 4 will be correspondingly shaped. However, this is not absolutely required. It is only necessary that the pitch of the threading 4 is equal to that of the tapped hole, whereas the diameter of the threading 4 should be such that the portions of the coil having passed the end portion 3 of the tubular member are sufficiently contracted to screw readily into the tapped hole. The rod-like member 2 is rotatable and axially shiftable in member 1 so that its end 8 can be retracted to clear the charging chamber or projected from the portion 3 of member 1 at least a distance according to the depth of the tapped hole in which the wire coil is to be inserted. The end 8 of the rod 2 is so shaped that it may be pushed in an axial direction through a coil 30 positioned in chamber 5 so as to engage that coil end which is closest to the threading 4. That means if the coil is provided at its end with a diametrical tang such as 31 in Fig. 2, the rod may be slotted at 9 to receive such tang in that slot. If the coil should have a differently shaped end the rod should be formed accordingly to grip the end from the interior of the coil. So far as hereinbefore described, the tool is similar to that of the aforementioned Patent No. 2,316,231. However, I have found that the conventional tool requires in its application a certain skill on the part of the user who must feel when the rod should be shifted in an axial direction, when it should be turned, when and at what rate it should be turned while it is advanced. At the same time, the user has to watch the rod engaging the coil and the coil entering the tapped hole and screwing into it. On account of this fact, the tool of the said patent does not accomplish a very satisfactory job when the rod is connected to a power drive. The mentioned difficulties and drawbacks encountered in attaching a tool of that type to a power-driven machine or in incorporating it in such machine to operate in a fully satisfactory manner can be overcome by the improvements according to my invention, which now will be described.

Starting with the parts hereinbefore described, care is to be taken that a coil charged into the portion 5 is in a position coaxial with respect to the tubular member so that the rod first retracted from the portion 5 will readily enter the coil to grip the remote coil end when the rod is projected. Means are provided in the illustrated embodiment to insure such axial alignment of a coil in portion 5 of member 1, and for this purpose the shoulder face 10 between the portions 5 and 3 is helically curved according to the helix of the coil end bearing on said face prior to the contraction of the coil. Furthermore, I have found it imperative that the movement of the rod after it has gripped the coil end is exactly in accordance with the progression of the coil in the threading 4 when the rod is turned. Another feature of the present invention is therefore the provision of an interiorly threaded portion 11 of the tubular member 1 which may be engaged by an external threading 12 of a portion of the member 2. The diameter of the threadings 11 and 12 may be different from that of threading 4 but the pitches of the threadings 11, 12 and 4 should be equal. The location and length of the threadings 11 and 12 on the respective members are so selected that the threadings are disengaged when the rod member 2 is retracted, that they become engaged when member 2 is projected with its end 8 approximately to the level of the shoulder 10, and that they remain engaged when the rod is projected beyond that shoulder. This is done in order to permit, on the one hand, rapid projection and retraction of the rod end 8 through the charging chamber 5, and to enforce, on the other hand, axial movement of the rod at the same rate as of the coil through the threading 4 and into the tapped hole. Intermediate the portion 5 and the threading 11 of the member 1, a cylindrical portion 13 is provided with an inner diameter according to the outer diameter of the rod 2 in order to insure coaxial movement of the latter when the threadings are out of engagement.

If a tool of the type described is to be attached to a machine for power drive, it is advisable to allow for a limited movement also of the tubular member 1, which however must be prevented from rotating. For this purpose, the tubular member 1 is provided on its outer circumference with two longitudinal grooves 14 and 15, the walls of which serve as guide surfaces. The tool may then be inserted in a hole 16 of a stationary member 17 so that it is free to move up and down in the latter. Members such as lateral set screws 18 with stop nuts 19 may be provided in the stationary member to engage with projections 20 the grooves 14 and 15 respectively. In order to insure that the recess 6 of the portion 5 is permanently clear for the reception of a coil the grooves 14 and 15 may end at a level so located as to prevent movement of the recessed portion 5 beyond the adjacent edge of the stationary member 17. It is, furthermore, advisable to provide for resilient means tending to return the tubular member 1 to its original position illustrated in Figs. 1 and 2 if it is shifted therefrom by a force acting in a downward direction. For this purpose, a flange or collar 21 is secured to the end of the member 1 opposite the threaded portion 3 and a compression spring 22 is positioned between the collar and said stationary member. The upper end 23 of rod 2 is so shaped that it may be inserted in a conventional chuck such as used for instance in connection with drilling machines.

Now it will be clear that the tool hereinbefore described may be readily attached to an existing machine including a shaft axially movable and rotatable in both directions, the rod 2 with its end 23 to be coupled with such shaft and the stationary part 17 shown in the drawing being, in that event, either an integral part of the machine frame or an attachment thereto.

In order to use the tool for inserting a coil in a tapped hole, the rod will be first retracted to a position where its end 8 has sufficiently cleared the charging chamber 5. Owing to the fact that in such position the threadings 11 and 12 are out of engagement, the tubular member will be held by spring 22 in its illustrated topmost position. A coil 30 may now be charged into the chamber 5, whereupon rod 2 will be lowered in order to bring its end 8 with slot 9 into engagement with the tang 31 of the coil end bearing on shoulder 10. Further shifting of the rod 2 in the same direction has for a result that the tubular member 1 is also taken along until the end face of the portion 3 is stopped by the top face 25 of the boss member 24 provided with the tapped hole 26 into which the coil is to be inserted. A circular recess 27 of the surface 25, coaxial with the tapped hole, will facilitate the alignment of the axes of the tool and said hole. If now, the rod 2 is rotated in the direction of the winding of the coil and of the threadings 4, 11 and 12, the two last mentioned threadings will engage each other and thereby advance the rod at the same rate as the coil advances in the threading 4. This rotation and advancement of rod 2 will be continued until the entire coil is inserted the required depth in the boss member. When this position of the coil is reached, the direction of the rod movement will be reversed as to both its axial and peripheral components. In consequence, the coil will be released and owing to its resiliency will expand so as to wedge into the thread groove of the tapped hole. Simultaneously, the rod 2 and the member 1 will return to their original position under the action of spring 22 and the thread connection 11, 12.

It has been stated that the tool just described is intended to be attached to or incorporated in a machine provided with an axially movable shaft and a reversible drive to rotate such shaft. The combination of such a machine is shown in Fig. 3 which comprises a stationary column 50 erected on a pedestal 51 and supporting at its top end a transverse beam 52 rigidly secured thereto. The rearward end of the beam carries an electric motor 53, and the forward end carries a housing 54 of a vertical bearing 55 and of a pulley 56 driven by the motor 53 via another pulley 57 and belt 58. A vertical shaft 59 is rotatable in said bearing and connected with the pulley 56 by splines indicated at 60 so that it may be shifted in axial direction while rotating. An arm 61 with a sleeve-shaped end 62 is slidably arranged on column 50. Its other end 63 carries a reversing gear 64 which may be of any suitable and conventional design. This gear is connected to shaft 59 so that the latter constitutes the input or driving shaft for said gear. The output shaft 65 is provided with a coupling device 66 to which the rod member 2 of the tool of Figs. 1 and 2 is attached. Another sleeve 67 is shiftable up and downward on the column and can be secured in an adjusted position by clamping means indicated at 68. The sleeve 67 is part of an arm which may be identical with the stationary member 17 mentioned in the foregoing description of the tool. This arm supports the spring 22 and guides the tubular tool member 1 in the manner stated hereinbefore. Underneath the sleeve 67 a table 69 is secured to the column 50 so as to serve as a support for the job or boss member 24 during the insertion of a coil with the aid of the machine. It will be noticed that the shafts 59 and 65, rod 2 and member 1 all are coaxially arranged and that the shafts and the rod may be rotated by the motor. In order to shift the last mentioned members in an axial direction, a foot lever 70 is pivoted on the pedestal at 71. A connecting rod 72 is linked to one arm of the lever at 73 and to the sleeve at 74, and a counterpoise 75 on the other lever arm tends to hold the sleeve 62 with all parts connected thereto including the shafts 59, 65 and rod 2 in a topmost position, whereas foot power applied to lever 70 will lower the mentioned parts. Means of suitable and conventional type may also be provided in order to control the reversing of the direction of rotation when the axially shiftable parts during the operation of the machine reach selected upper and lower end positions. For this purpose, the reversing gear may have a shift lever indicated at 76 to which a threaded spindle 77 with two nuts 78 and 79 is attached. The nuts are adjustable between two fixed abutments 80 and 81, and the shift lever 76 will be lowered in relation to gear 64, to change the rotation from the one direction to the other when upon lifting of sleeve 62 and associated parts, nut 79 reaches the abutment 81. Similarly, lever 76 will be raised to reverse the rotation when upon lowering of sleeve 62 the nut 78 reaches the abutment 80. Switching means may also be provided in order to start and stop the motor 53 automatically in timed relationship to the operation of the machine. Such switch is diagrammatically illustrated by a lever 82 pivoted on the motor 53 at 83. A short arm 84 of the lever is connected to the — conductor from a current source (not shown), whereas the + conductor is directly connected to a motor terminal 85. The other motor terminal 86 is arranged opposite the lever arm 84 so as to cooperate with the latter as part of a contact switch. A longer arm 87 of lever 82 extends into the path of the sleeve 62 so as to bear on the latter and to separate the contacts 84 and 86 when the sleeve is in its topmost position, but to close the circuit when the sleeve is lowered a short distance. It will be clear that with this arrangement the motor will be stopped each time when the sleeve returns to its topmost position after a coil-inserting operation and will be started again when the sleeve 62 is lowered by actuation of the foot lever. If this is not desired the nut 79 may be adjusted so low that the sleeve 62 cannot reach that level at which it would lift the lever arm 87. In that event motor 53 will run continuously when once connected to the power source. In this connection, it should be noticed that nut 79 will not only effect reversal of the rotation of the shafts, but it will positively block the sleeve from further upward movement owing to the fact that the lever 76 can have only a limited freedom of movement relatively to the housing of the gear 64. Hence, the nut may act with respect to sleeve 62 as an adjustable abutment via the spindle 77, lever 76, gear 64 and parts 63 and 61.

In the described combination of parts, the machine requires, prior to its operation, merely the following adjustments: first, setting and fixing the arm 17 so that there is a short space between the bottom face of member 1 and the top surface of the boss 24 into which a coil is to be inserted; second, setting nut 78 according to the depth to which the coil is to be inserted; and third, adjusting nut 79 according to the height to which the rod 2 is to be lifted, which is at least the height at which the rod has cleared the charging chamber 5 of member 1. When or before these adjustments are completed, the boss 24 will be so positioned that the axis of the tapped hole therein is in line with the tool axis. A coil may, then, be charged into the chamber 5 of the member 1 and foot lever 70 may be pressed down. Thereby, the motor will be started and the rod lowered into the coil so as to grip the coil end. When the rod is lowered so far the threadings 11 and 12 will engage each other. Thereby a pressure will be exerted on the member 1 so that it will be shifted downward against the restraint of spring 22, to bear on the surface of boss 24. From this position on, the rod can proceed in axial direction only according to the pitch of the threadings. Continuing this movement, the rod will screw the coil through the prewinder threading 4 of the tubular member and into the tapped hole of the boss. When the coil is inserted to the desired depth, nut 78 according to its preceding adjustment, will have reached the abutment 80 and completed reversal of the rotation of the rod. In consequence, the threadings 11 and 12 will lift the rod 2 relatively to member 1 until the rod has cleared the charging chamber, no matter whether or not the operator of the machine still exerts some pressure on the foot lever 70. As soon as this lever is released, the counterpoise 75 will lift the connected parts until at the adjusted level or at the top level the parts are arrested and the direction of rotation reversed. Whether or not the motor is simultaneously stopped will depend on whether or not the adjustment was made for the top level at which the sleeve 62 is operative to switch off the motor.

It is, of course, possible to use in a machine of the type described a reversible motor with a reversing switch controlled by an adjustable abutment device such as constituted by the parts 77 to 81 and which is responsive to the axial movement of the connected rod and shafts. However, the embodiment of Fig. 3 has been selected for illustration of the invention in order to show how the tool can be readily applied to an existing drilling machine with a unidirectionally rotating motor. A drilling machine may comprise the column or standard 50 with pedestal 51, table 69, cross beam 52 with associated parts, shaft 59, sleeve 62 including arm 61 for moving the shaft up and downward, and the foot lever 70 and connecting rod 72 arrangement including the counterpoise 75 for shifting the sleeve 62. A tapping head of a suitable type available on the market as an attachment to a drilling machine may, then, be connected to the arm 61 as the reversing gear denoted 64 in Fig. 3. Such tapping head will provide all parts required in addition to the drilling machine and including the adjustable controls for reversing the direction of rotation of the output shaft 65 to which a chuck 66 may be secured. The tool of Figs. 1 and 2 may then be attached to the drilling machine with tapping head in the manner described so as to complete the machine according to the invention. It will be clear that in order to make the machine applicable for coils of different diameters an exchange of only the tubular member 1 and the rod-member 2 is required.

It will be apparent to those skilled in the art that many alterations and modifications of the mechanism illustrated and described are possible without departing from the spirit and essence of my invention which for this reason shall be limited only by the scope of the appended claims.

I claim:

1. A tool of the character described, comprising a tubular member including an internally threaded end portion and an adjacent laterally recessed portion forming a charging chamber to receive therein a wire coil intended to be contracted by passing it through said end portion, said member further including a second internally threaded portion intermediate its other end and said recessed portion, and a rotatable and axially movable rod-like member in coaxial arrangement with said tubular member, said rod-like member including one end projectable through said recessed portion and said first mentioned end portion of said tubular member and adapted to grip the end of a coil from the interior thereof, another end portion adapted for connection with a reversible drive, and an intermediate portion externally threaded for engagement of said second internal threading, all said threadings being of a pitch according to the tapped threading of the hole of the boss or nut member into which said coil is to be inserted.

2. A tool as claimed in claim 1, said second internal threading of said tubular member and said external threading of said rod-like member being of such lengths and so located that they engage each other when said gripping end of said rod-like member is in a position close to that end of the charging chamber which is adjacent said first internal threading, and that they stay engaged when the rod-like member is projected from said position in the direction of said first internal threading, but that they are disengaged when said rod-like member is retracted from said position, and said tubular member further including an internally cylindrical portion to guide said rod member coaxially when said threadings are out of engagement.

3. A tool as claimed in claim 1, said threading of said internally threaded end portion of said tubular member having an outer diameter according to that of the threading of a tapped hole into which said coil is intended to be inserted, said recessed portion having a diameter according to that of said coil prior to its contraction, and the shoulder face between the side wall of said charging chamber and the threading of said end portion being helically inclined according to the helix of said coil prior to its contraction.

4. A tool of the character described, comprising a tubular member including an internally threaded end portion and an adjacent laterally recessed portion forming a charging chamber to receive therein a wire coil intended to be contracted by passing it through said end portion, said member further including a second internally threaded portion intermediate its other end and said recessed portion, said tubular member embodying means for engagement with an external stationary member to guide said tubular member non-rotatable in an axial direction, and a rotatable and axially movable rod-like member in coaxial arrangement with said tubular member, said rod-like member including one end projectable through said recessed portion and said first mentioned end portion of said tubular member and adapted to grip the end of a coil from the interior thereof, another end portion adapted for connection with a reversible drive, and an intermediate portion externally threaded for engagement of said second internal threading, all said threadings being of a pitch according to the tapped threading of the hole of the boss or nut member into which the said coil is to be inserted.

5. A tool of the character described, comprising a tubular member including an internally threaded end portion and an adjacent laterally recessed portion forming a charging chamber to receive therein a wire coil intended to be contracted by passing it through said end portion, said member further including a second internally threaded portion intermediate its other end and said recessed portion, a rotatable and axially movable rod-like member in coaxial arrangement with said tubular member, said rod-like member including one end projectable through said recessed portion and said first mentioned end portion of said tubular member and adapted to grip the end of a coil from the interior thereof, another end portion adapted for connection with a reversible drive, and an intermediate portion externally threaded for engagement of said second internal threading, all said threadings being of a pitch according to the tapped threading of the hole of the boss or nut member into which said coil is to be inserted, and resilient means in connection with said tubular member and adapted to bear on a stationary member so as to return said tubular member to an original position if shifted from such position.

6. A tool as claimed in claim 5 further comprising means in connection with said rod to shift said rod in the direction of its axis selective into or out of engagement of its threading with the mating threading of said tubular member.

7. A tool as claimed in claim 5, said tubular member further including lengthwise extending guide faces for the engagement by a stationary part to prevent said tubular member from moving in other than axial direction.

8. A tool as claimed in claim 5, further comprising means in connection with said other end portion of the rod-like member so as to follow axial movement of said rod for actuation of a control of said drive according to two selected end positions of said rod-like member.

ERWIN ECKENER.